H. N. RAYMOND.
SOLAR TRANSIT.
APPLICATION FILED NOV. 6, 1917.
1,274,935.
Patented Aug. 6, 1918.
2 SHEETS—SHEET 1.
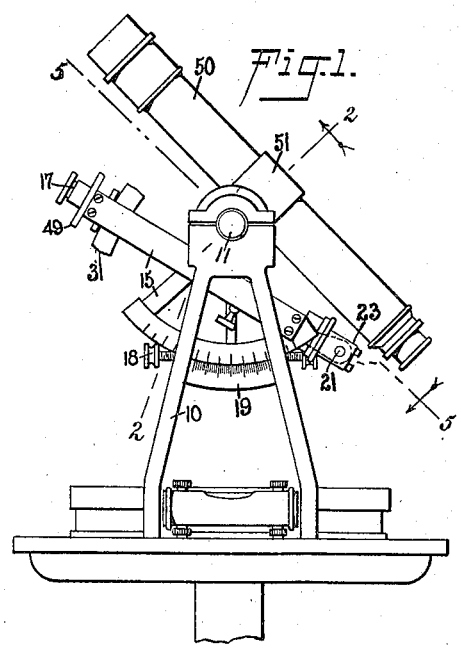
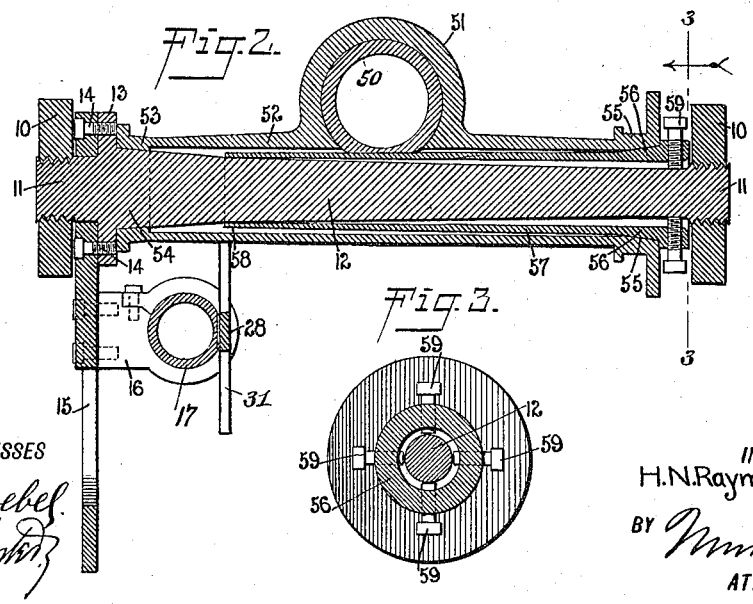
WITNESSES
INVENTOR
H. N. Raymond
BY
ATTORNEYS

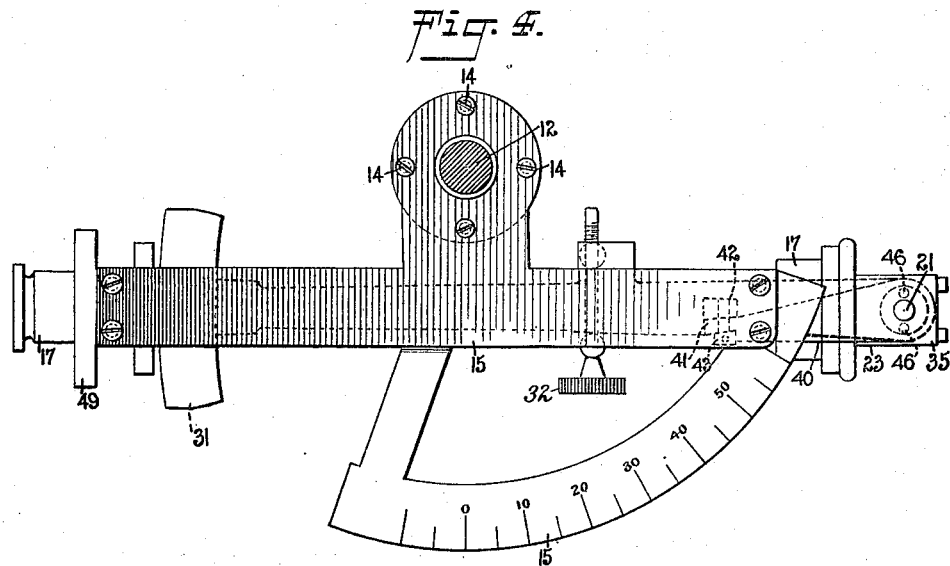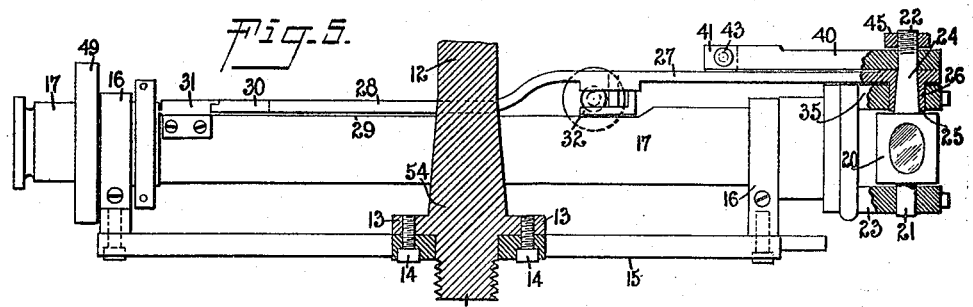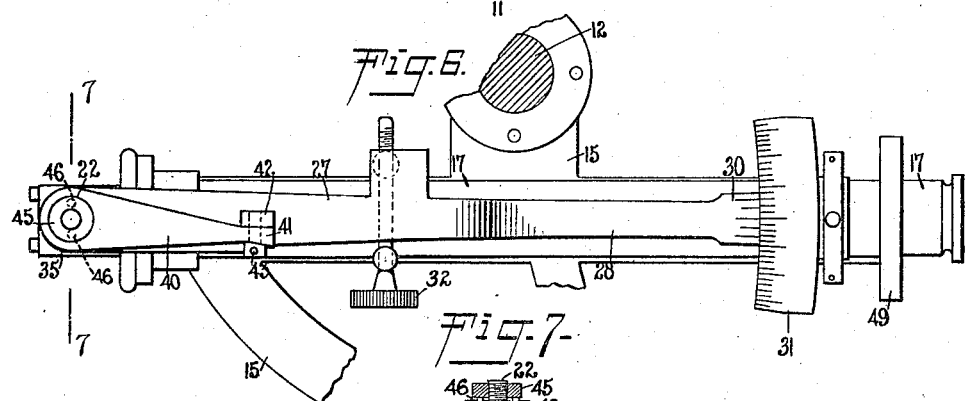

UNITED STATES PATENT OFFICE.

HERBERT NEWTON RAYMOND, OF OLYMPIA, WASHINGTON.

SOLAR TRANSIT.

1,274,935.  Specification of Letters Patent.  Patented Aug. 6, 1918.

Application filed November 6, 1917. Serial No. 200,565.

*To all whom it may concern:*

Be it known that I, HERBERT N. RAYMOND, a citizen of the United States, and a resident of Olympia, in the county of Thurston and State of Washington, have invented a new and Improved Solar Transit, of which the following is a full, clear, and exact description.

The invention relates to solar transits of the solar telescope and reflector type, and its object is to provide a new and improved solar transit arranged to permit easy adjusting and quick testing. Another object is to provide a solar transit which is very compact, well balanced, exceedingly accurate and not liable to get easily out of adjustment.

In order to accomplish the desired result, use is made of a main axle mounted to turn in standards of the instrument, a latitude arc attached to the main axle and carrying a solar telescope, and a transit telescope provided with a hub or a hollow axle mounted to turn at one end on the said main axle and on the other end on a sleeve adjustably held on the main axle. Use is also made of a reflector mounted to turn on one end of the solar telescope, a declination arm mounted to swing from the axis of the said reflector, and manually controlled means for turning the reflector independent of the declination arm.

A practical embodiment of the invention is represented in the accompanying drawings forming a part of this specification, in which similar characters of reference indicate corresponding parts in all the views.

Figure 1 is a side elevation of the solar transit;

Fig. 2 is an enlarged cross section of the same on the line 2—2 of Fig. 1;

Fig. 3 is a sectional side elevation of the same on the line 3—3 of Fig. 2;

Fig. 4 is an enlarged side elevation of the solar telescope with the main axle shown in section;

Fig. 5 is a plan view of the same with the main axle and other parts shown in section;

Fig. 6 is an elevation of the inner side of the solar telescope; and

Fig. 7 is a cross section of the same on the line 7—7 of Fig. 6.

The frame of the solar transit is provided with suitable standards 10 in which are mounted to turn the ends of a main axle 12 provided near one end with a flange 13 on which is secured, by screws 14 or other fastening means, a latitude arc 15 provided with a bearing 16 in which is mounted to turn a solar telescope 17, the axis of which is at a right angle to the axis of the main axle 12. The latitude arc 15 is graduated with 20′ divisions but only every fifth degree is shown. A tangent screw 18 serves to move the latitude arc 15, and the said latitude arc 15 indicates on a suitable vernier 19 attached to a corresponding standard 10. A reflector 20 is arranged at the lower end of the solar telescope 17 and this reflector is provided with trunnions 21, 22, of which the trunnion 21 is journaled in a bearing 23 attached to or forming part of the lower end of the solar telescope 17. The other trunnion 22 is provided with a conical portion 24 which fits into a correspondingly shaped bore 25 formed in the hub 26 of a declination arm 27 extending lengthwise of the solar telescope 17, as plainly illustrated in Figs. 4, 5 and 6. The declination arm 27 has its end portion 28 slightly offset and fitting a flattened portion 29 on the inner side of the solar telescope 17, and the declination arm 27 terminates in a vernier 30 indicating on a declination arc 31 attached to the solar telescope 17. A tangent screw 32 mounted on the solar telescope 17 engages the declination arm 27 so as to impart a swinging motion to the latter whenever it is desired to do so.

The hub 26 of the declination arm 27 is mounted to turn in a bearing 35 attached to or forming part of the lower end of the solar telescope 17, as plainly indicated in Figs. 5 and 7. On the trunnion 22 is keyed or otherwise secured a reflector arm 40, the free end 41 of which is adapted to abut against either side of a stop lug 42 secured to or formed on the declination arm 27. A screw 43 normally fastens the free end 41 of the reflector arm 40 to the stop lug 42. A nut 45 screws on the outer end of the trunnion 22 and bears on pins 46 mounted to slide in the fulcrum end of the reflector arm 40 so as to force the other ends of the pins in contact with the fulcrum end of the declination arm 27 with a view to draw the conical portion 24 of the trunnion 22 in firm contact with the wall of the bore 25 in the hub 26 of the declination arm 27. The outer end of the solar telescope 17 is provided with the usual hour circle 49.

The transit telescope 50 is mounted in a band 51 forming an integral part of a hub 52, one end 53 of which engages a conical bearing 54 formed on the main axle 12, as plainly shown in Fig. 2. The other end 55 of the hub 52 engages a conical bearing 56 formed on a sleeve 57 through which extends the main axle 12. One end 58 of the sleeve 57 fits onto the main axle 12 while the other end 56 is provided with screws 59 engaging the axle 12 to permit of adjusting the sleeve relative to the axle 12 so that the axis of the sleeve 57 coincides with the axis of the axle 12. By reference to Fig. 2 it will be noticed that the axle 12 is tapered from the bearing 54 toward the other end so that the sleeve 57 is spaced from the axle except at the outer end 58 thereof, and hence the sleeve can be readily adjusted by the set screw 59 in order to cause the axis of the sleeve 57 to coincide with the axis of the axle 12.

In using the solar transit in the field it is incumbent on the operator, first, to determine whether the axles of the transit telescope and that of the latitude arc are parallel, and, second, if not, to make them so. This operation is easily accomplished by having the hub 52 mounted to revolve on the main axle 12 carrying the latitude arc 15. In case the line of sight of the telescope 50 shifts when the axle 12 is revolved in its bearings 10 then the axle 12 and the hub 52 do not coincide and this can be easily remedied by the operator adjusting the screws 59 correspondingly. Other tests and adjustments are made in the usual manner. Compactness and balance are obtained by having the declination arc 31 but 3½ degrees more than long enough to set off the declination one way, that is, north or south, and by placing it as near the axis of the solar telescope 17 as is practical, thereby allowing the solar telescope to be mounted inside the standards 10 of the transit without interfering in any of its positions with the transit telescope 50. It will be noticed that the reflector arm 40 can be swung around from the position shown in Fig. 6 until its free end 41 abuts against the other side of the stop lug 42. By this movement the same effect upon the reflector 20 is obtained corresponding to the moving of the vernier 30 20° on the declination arc 31. Only every third division of the vernier 30 and every fifth division of the declination arc 31 are shown in Fig. 6. When the reflector arm 40 is in the position shown in Fig. 6, north declination is set off from its zero 0 on the declination arc 31 in the direction 20. When the free end 41 engages the other side of the stop lug 42, as previously explained, south declination is set off from its zero 0 on the declination arc 31 in the direction of 20. By mounting the latitude arc 15 on a long and well supported axle 12 and by providing a comparatively long declination arm 28 the desired accuracy is obtained. The instrument is also not liable to get out of adjustment owing to the protected position of the parts between the standards 10 of the transit.

It may be stated that two faults are apparent, namely: the optical axis of the transit telescope 50 does not intersect the axis of the hub 52, but this affects only the taking of vertical angles which may be allowed for: the wear of the bearing of the hub 52 on the axle 12 is taken up by sliding the sleeve 56 lengthwise on the axle 12 toward the bearing 54 thereby putting the optical axis of the transit telescope 50 somewhat to one side of the vertical axis of the transit, but this shifting is so small that it can be neglected in work of ordinary precision.

Having thus described my invention, I claim as new and desire to secure by Letters Patent:—

1. In a solar transit, a main axle provided with a latitude arc carrying a solar telescope, a sleeve on the said axle, adjusting screws engaging the sleeve and the main axle, a hub mounted to turn at one end on the said main axle and at the other end on the said sleeve, and a transit telescope carried by the said hub.

2. In a solar transit, a main axle, a latitude arc attached thereto, a solar telescope mounted on the said latitude arc and having its axis at right angles to the axis of the main axle and spaced therefrom, a transit telescope, and a hub on which the transit telescope is mounted, the hub being mounted to turn on the said axle.

3. In a solar transit, a main axle, a latitude arc attached thereto, a solar telescope mounted on the said latitude arc, a transit telescope, a hub on which the transit telescope is mounted, the hub being mounted to turn on the said axle, and adjusting means to adjust the said hub relative to the said main axle until the axis of the hub coincides with the axis of the said main axle.

4. In a solar transit, the combination of standards, a main axle journaled in the said standards, a transit telescope mounted on the said axle, and a solar telescope mounted on the said axle independent of the transit telescope and extending between the said standards.

5. In a solar transit, the combination of standards, a main axle journaled in the said standards, a latitude arc secured to the said main axle intermediate the said standards, a solar telescope mounted on the said arc, a hub mounted to turn on the said main axle intermediate the standards, and a transit telescope mounted on the said hub.

HERBERT NEWTON RAYMOND.

Copies of this patent may be obtained for five cents each, by addressing the "Commissioner of Patents, Washington, D. C."